(12) United States Patent
Seetzen (10) Patent No.: US 8,810,503 B2
(45) Date of Patent: Aug. 19, 2014

(54) THIN DISPLAYS HAVING SPATIALLY VARIABLE BACKLIGHTS

(75) Inventor: Helge Seetzen, Westmount (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 449 days.

(21) Appl. No.: 13/257,930

(22) PCT Filed: Apr. 5, 2010

(86) PCT No.: PCT/US2010/029941
§ 371 (c)(1),
(2), (4) Date: Sep. 20, 2011

(87) PCT Pub. No.: WO2010/120582
PCT Pub. Date: Oct. 21, 2010

(65) Prior Publication Data
US 2012/0032999 A1  Feb. 9, 2012

Related U.S. Application Data (60) Provisional application No. 61/169,714, filed on Apr. 15, 2009.

(51) Int. Cl.
G09G 3/36 (2006.01)
G09G 3/34 (2006.01)
G02F 1/1335 (2006.01)

(52) U.S. Cl.
CPC ........ *G02F 1/133603* (2013.01); *G09G 3/3426* (2013.01); *G06G 2320/0233* (2013.01); *G02F 2001/133612* (2013.01); *G09G 2320/0646* (2013.01); *G09G 2320/0271* (2013.01)
USPC ........................................... 345/102; 345/690

(58) Field of Classification Search
USPC .................................................. 345/87–104
See application file for complete search history.

(56) References Cited

U.S. PATENT DOCUMENTS

| | | |
|---|---|---|
| 5,634,835 A | 6/1997 | Wu |
| 5,756,147 A | 5/1998 | Wu |
| 5,978,142 A * | 11/1999 | Blackham et al. ............ 359/618 |
| 6,791,260 B2 | 9/2004 | Komatsu |
| 7,271,427 B2 | 9/2007 | Tsubokura |
| 7,505,018 B2 * | 3/2009 | Feng et al. ...................... 345/89 |
| 7,532,192 B2 * | 5/2009 | Feng et al. .................... 345/102 |
| 7,573,457 B2 * | 8/2009 | Daly ............................. 345/102 |
| 8,199,401 B2 * | 6/2012 | Ninan et al. .................. 359/443 |
| 8,446,351 B2 * | 5/2013 | Whitehead et al. ............. 345/87 |
| 2005/0105284 A1 | 5/2005 | Ishizuka |

(Continued)

FOREIGN PATENT DOCUMENTS

| | | |
|---|---|---|
| GB | 1201092 | 8/1970 |
| GB | 1299870 | 12/1972 |

(Continued)

OTHER PUBLICATIONS

Chae "Translation of KP 10-2004-0096186" Nov. 16, 2004.*

*Primary Examiner* — Dmitriy Bolotin
(74) *Attorney, Agent, or Firm* — John W. Carpenter (57) ABSTRACT

A display has a light source layer having control inputs for controlling the light source layer to emit light such that the light output varies smoothly with position in a manner determined by the control inputs. An LCD panel or other spatial light modulator modulates light from the light source layer. The light source layer may be thin.

20 Claims, 11 Drawing Sheets

(56) References Cited

U.S. PATENT DOCUMENTS

| | | | |
|---|---|---|---|
| 2007/0097321 A1* | 5/2007 | Whitehead et al. | 353/30 |
| 2007/0146257 A1* | 6/2007 | Whitehead et al. | 345/84 |
| 2007/0268211 A1* | 11/2007 | Whitehead et al. | 345/55 |
| 2007/0268224 A1* | 11/2007 | Whitehead et al. | 345/84 |
| 2010/0007577 A1* | 1/2010 | Ninan et al. | 345/1.3 |
| 2010/0007599 A1* | 1/2010 | Kerofsky | 345/102 |
| 2010/0020003 A1* | 1/2010 | Feng | 345/102 |
| 2010/0079364 A1* | 4/2010 | Feng | 345/102 |
| 2010/0277515 A1* | 11/2010 | Ward et al. | 345/690 |

FOREIGN PATENT DOCUMENTS

| | | |
|---|---|---|
| JP | S61-14743 | 1/1986 |
| JP | 2002156633 | 5/2002 |
| JP | 2005-071634 | 3/2005 |
| JP | 2006-201079 | 8/2006 |
| JP | 2007-234599 | 9/2007 |
| JP | 2008-218377 | 9/2008 |
| KR | 2007-0080441 | 8/2004 |
| KR | 2004-0096186 | 11/2004 |
| KR | 2008-0032440 | 4/2008 |
| KR | 10-0866542 | 11/2008 |
| WO | 02/069030 | 9/2002 |
| WO | 03/077013 | 9/2003 |
| WO | 2005015960 | 2/2005 |
| WO | 2006/010244 | 2/2006 |
| WO | 2007017795 | 2/2007 |
| WO | 2008068925 | 6/2008 |
| WO | 2008/092276 | 8/2008 |

* cited by examiner

THIN DISPLAYS HAVING SPATIALLY VARIABLE BACKLIGHTS

CROSS-REFERENCE TO RELATED APPLICATIONS

This application claims priority to U.S. Provisional Patent Application No. 61/169,714 filed 15 Apr. 2009, hereby incorporated by reference in its entirety.

TECHNICAL FIELD

This invention relates generally to displays. Some non-limiting examples of displays are televisions, home cinema displays, computer displays, commercial displays, stadium displays, electronic billboards and the like. The invention relates to displays of the type that have spatially variable backlights and to backlights suitable for such displays.

BACKGROUND

Some displays have a spatial light modulator, such as a LCD panel, illuminated by a backlight. Light from the backlight interacts with the spatial light modulator which spatially modulates the light so as to present images to a viewer. The images may be still images or video images for example. In some such displays, the backlight has different areas that are separately controllable so that the intensity of light emitted by the backlight can be made to vary in a desired way over the spatial light modulator. This can provide improved images. Examples of displays that have spatially variable backlights are described in the following patent publications:
PCT Patent Application Publication Nos. WO02/069030, WO03/077013, WO2006/010244 and WO2008/092276.

There is consumer demand for displays that are thin front-to-back. Such displays can be more easily accommodated in some locations than thicker displays and are also less bulky in appearance than thicker displays.

SUMMARY

This invention has a range of aspects. Some different aspects provide:
displays which may be, for example, computer displays, televisions, video monitors, home cinema displays, commercial displays, industrial displays, electronic billboards or the like;
backlights usable in displays;
controllers for displays; and,
methods for operating backlights and displays.

In addition to the exemplary aspects and embodiments described above, further aspects and embodiments will become apparent by reference to the drawings and by study of the following detailed descriptions.

BRIEF DESCRIPTION OF DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
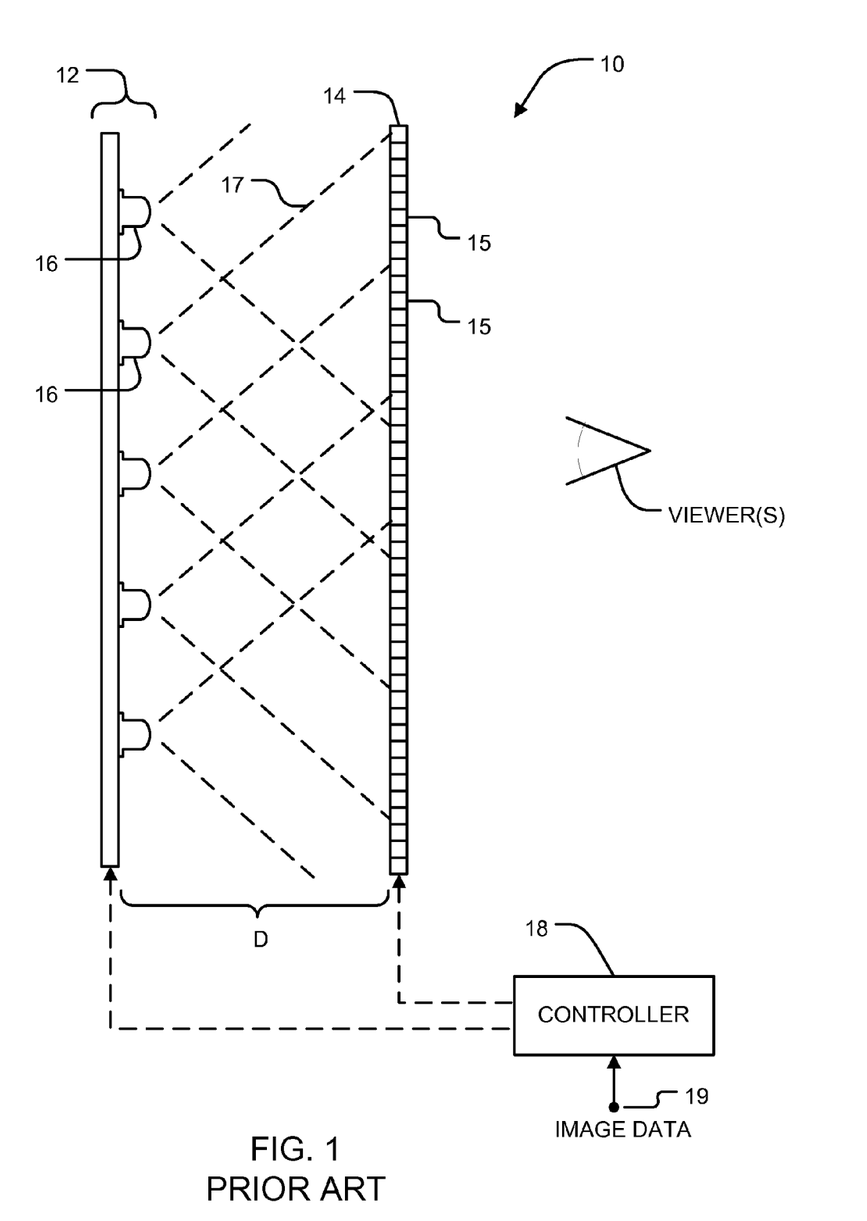
FIG. 1 is a partial cross-section of a prior art display having a spatially variable backlight.

FIG. 1 shows a display 10 according to the prior art. Display 10 has a backlight 12 which illuminates a spatial light modulator 14. Spatial light modulator 14 comprises an array of pixels 15 which can be controlled to pass varying amounts of the light incident on them to a viewing area. In the illustrated display, the spatial light modulator is of a transmissive type. Spatial light modulator 14 comprises an LCD panel, for example.

Backlight 12 comprises a plurality of individually controllable backlight emitters 16. Each light emitter 16, when on, emits light into a solid angle 17 and therefore illuminates an area of spatial light modulator 14. Light from different individually controlled light emitters 16 overlaps on spatial light modulator 14.

It is generally desirable that the illumination of spatial light modulator 14 vary smoothly from place to place to avoid visible artifacts. In the display shown in FIG. 1, this is achieved by ensuring that the light from different neighboring light emitting elements 16 overlaps at spatial light modulator 14. This, in turn, is achieved by providing a space D between light emitting elements 16 and spatial light modulator 14.

A controller 18 controls the intensity of light emitted by light emitting elements 16 and also the transmissivity of pixels 15 of spatial light modulator 14 in response to image data received at an input 19.

Figure 2A:
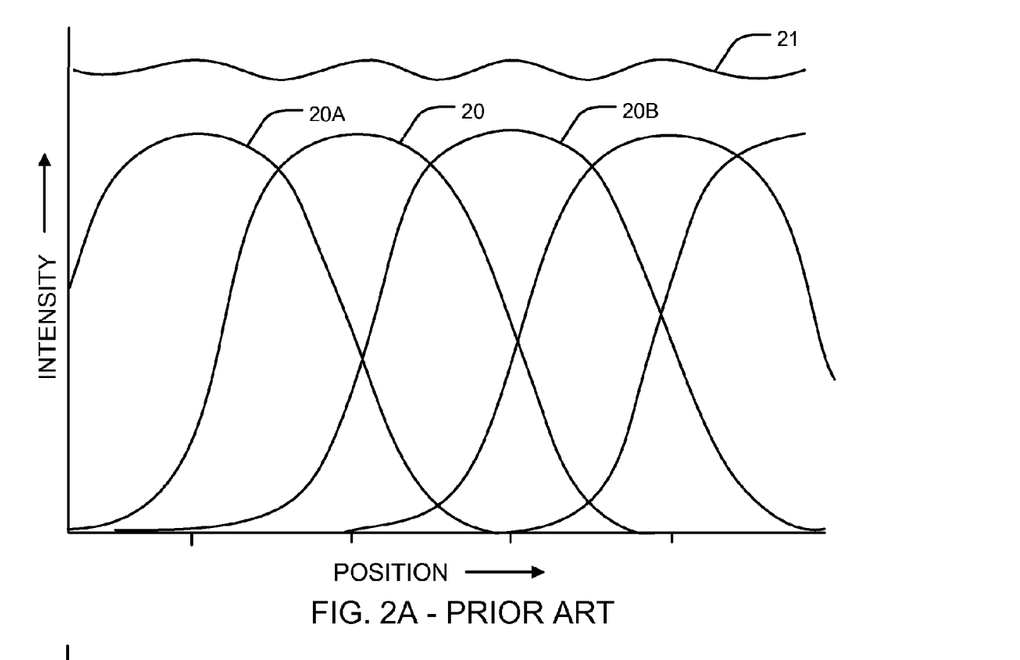
FIG. 2A illustrates overlapping point spread functions of light sources in a display like that of FIG. 1.

FIG. 2A shows a point spread function 20 of an individual light emitting element 16 of the display of FIG. 1 as well as point spread functions 20A and 20B for neighboring light emitting elements 16. The point spread functions vary smoothly across spatial light modulator 14. Curve 21 shows the sum of the point spread functions as a function of position. Curve 21 also indicates the variation of light intensity with position on spatial light modulator 14 for the case that all of light emitters 16 are driven to emit light of equal intensities. Curve 21 may be made to be quite uniform by appropriate selection of the spacing between light emitters 16, the point spread functions of light emitters 16 and the distance D.

Figure 2B:
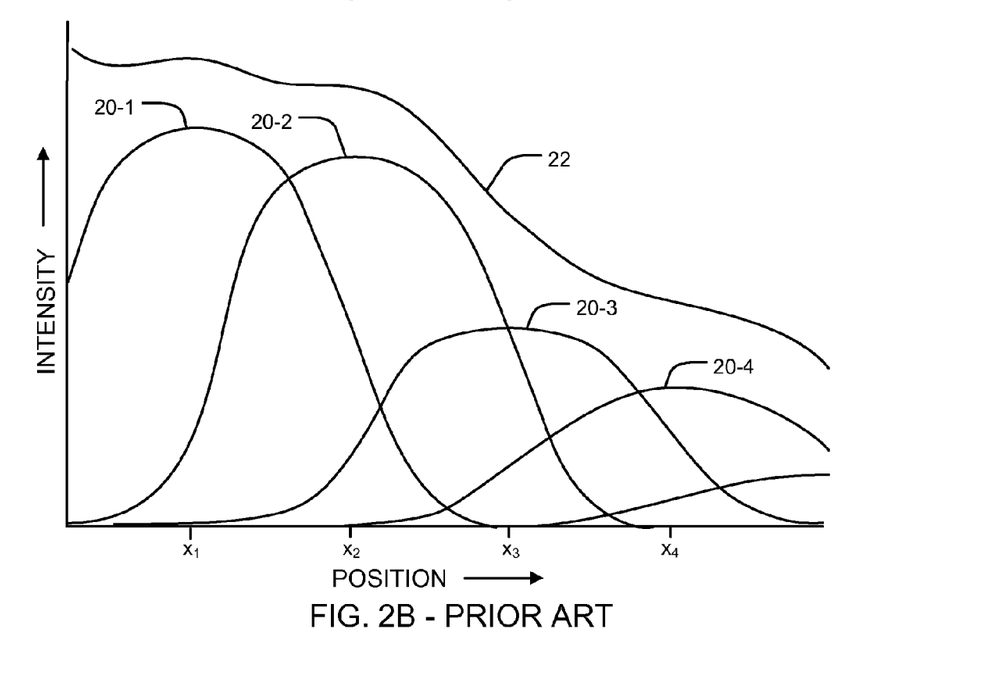
FIG. 2B illustrates the distribution of light from individual light sources in a display near a boundary between brighter and dimmer areas.

FIG. 2B illustrates a situation in which four light emitters 16 at locations $x_1$ through $x_4$ are driven at different intensity levels. Curves 20-1 through 20-4 indicate the amount of light emitted by each of the light emitters as a function of position on spatial light modulator 14. Curve 22 is the sum of the light emitted by the light emitters 16 on spatial light modulator 14. It can be seen that by appropriately controlling the intensity of light emitted by light emitters 16 the intensity of light with which spatial light modulator 14 is illuminated can be made to vary fairly smoothly from point to point on spatial light modulator 14.

A disadvantage of display 10 is that the distance D required for an optimal distribution of light on spatial light modulator 14 from light emitters 16 may be sufficiently large that the display is thicker than might otherwise be desired.

Figure 3:
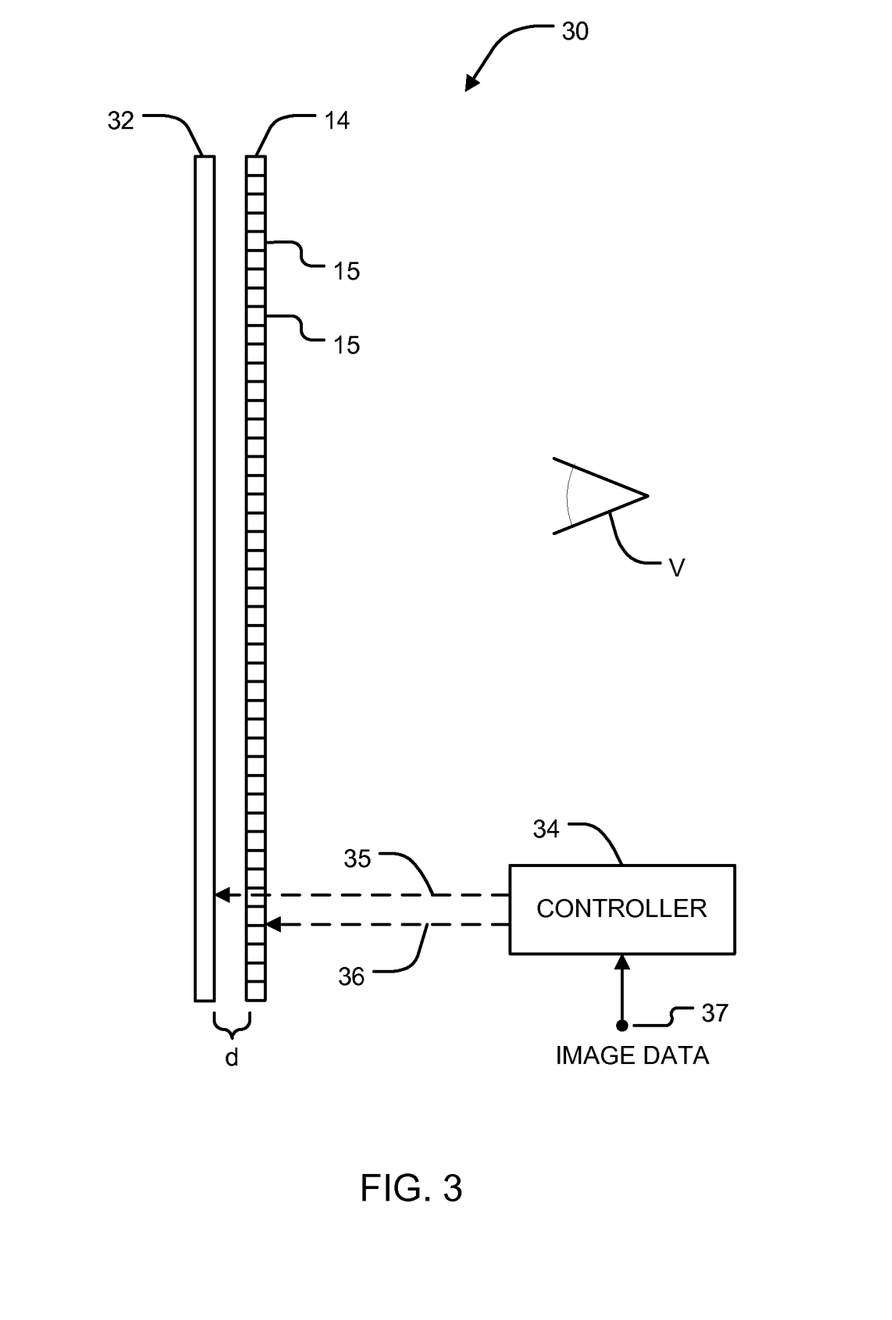
FIG. 3 is a schematic partial cross-section of a display according to an example embodiment of the invention.

FIG. 3 illustrates a display 30 according to an example embodiment of the invention in which a distance d between a light source layer 32 and a transmissive spatial light modulator 14 having controllable pixels 15 may be fairly small. In some embodiments the light source layer 32 may be directly against or integrated with spatial light modulator 14. Display 30 comprises a controller 34 that generates control signals 35 that control light source layer 32 to emit light having an intensity that varies spatially over the area of spatial light modulator 14. Controller 34 also generates control signals 36 that control the pixels 15 of spatial light modulator 14. Controller 34 receives image data at an input 37 and, based on the image data, generates control signals 35 and 36 to cause a viewer V to see an image according to the image data.

Figure 4:
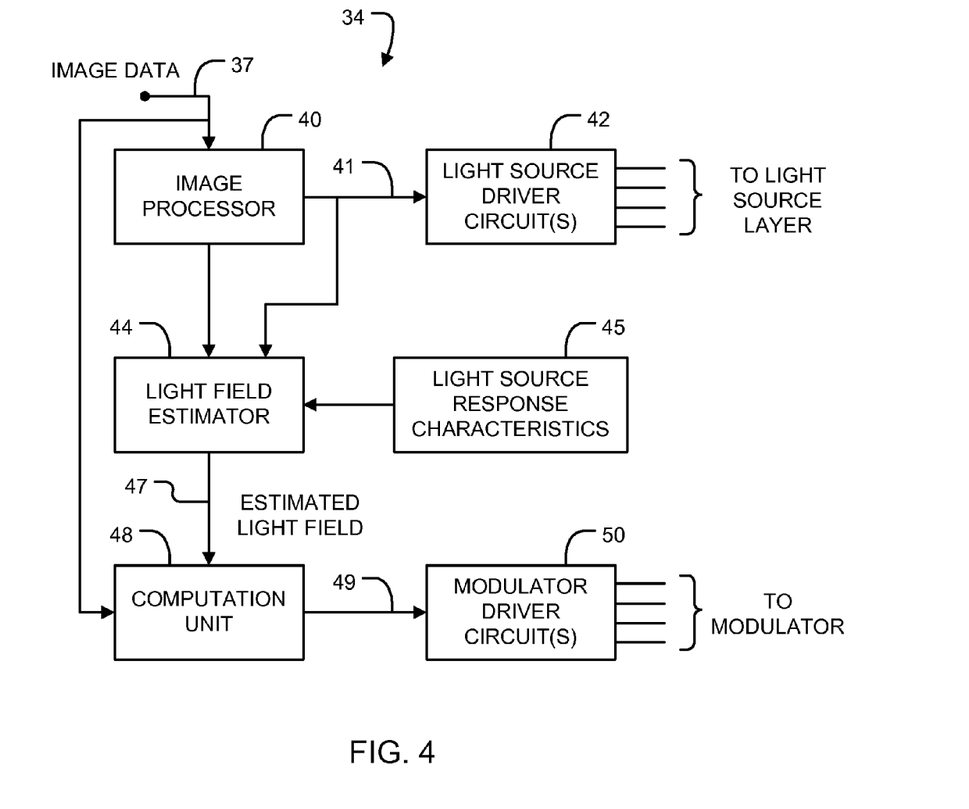
FIG. 4 is a block diagram of a controller for a display according to an example embodiment of the invention.

FIG. 4 is a functional block diagram of a controller 34 that may be used in the display of FIG. 3. The components of controller 34 may comprise one or more of:
  one or more data processors (which may comprise general purpose processors, digital signal processors or graphics processors, for example, executing software or firmware instructions that cause the data processors to operate as described below;
  hard-wired logic circuits (which may be, for example, provided in one or more application-specific integrated circuits (ASICs));
  configurable logic hardware such as field-programmable gate arrays (FPGAs) configured to provide signal processing paths that provide outputs as described below;
  etc.

An image processor 40 receives image data from input 37 and generates signals 41 that control light source driver circuits 42 to cause light source layer 32 to generate light having a desired spatial variation in intensity. Driving signals 41 are also supplied to a light field estimator 44 which produces an estimate 47 of the light field that would be produced by light source layer 32 in response to the driving signals 41. Light field estimator 44 produces light field estimate 47 based in part on light source response characteristics 45. Light source response characteristics 45 may, for example, comprise functions or parameters that are in a data store accessible to light field estimator 44. Light field estimate 47 may comprise a two-dimensional map indicating light intensity as a function of position on light source layer 32 for a given set of signals 41.

In some embodiments, image processor 40 derives signals 41 by a process that generates a lower-resolution version of the image data. This may be done, for example, by a process that involves one or more of low-pass filtering; downsampling; and/or taking local weighted averages of pixel values specified in the image data. The lower resolution version of the image data may be passed through a scaling function to generate signals 41. Advantageously, the application of signals 41 to light source layer 32 results in the emission of light that, at every pixel of spatial light modulator 14, is somewhat more intense than is required for that pixel by the image data. The pixels of spatial light modulator 14 can then be operated to attenuate the light to have an intensity at each pixel as specified by the image data.

In some embodiments, light field estimation comprises, based on control inputs estimated to correspond to control signals 41, estimating electrical potentials corresponding to positions on light source layer 32 and, based on a function relating light output for each area of light source layer 32 to applied electrical potential (or electrical field) estimating light outputs for the positions on light source layer 32. These steps may be performed at a resolution lower than that of modulator 14. If there is an optical path between light source layer 32 and modulator 14 that affects the light emitted by light source layer 32 then light field estimation may comprise applying a point spread function or other model of the effect of the optical path on the light outputs determined above.

A computation unit 48 receives image data and the estimated light field 47 and generates driving values 49 which control the transmission of light by pixels 15 by way of modulator driver circuits 50. In some embodiments, computation unit 48 performs a calculation which comprises dividing an intensity value represented by the image data for a particular location by a value of the estimated light field corresponding to that location. Corrections may be applied to take into account a response of modulator driver circuits and/or spatial light modulator 14 to driving signals 49.

Advantageously light source layer 32 may have significantly fewer control inputs than spatial light modulator 14. In spatial light modulator 14, each pixel 15 can be individually addressable. Light source layer 32 is controllable in a coarser resolution. However, light source layer 32 is constructed such that its light output varies with a desired smoothness.

In some embodiments, this smoothness is expressed by the equation:

$$\left|\frac{dl}{dx}\right| \leq \left|\frac{L_a - L_b}{x_a - x_b}\right| \times \xi$$

where l is the light intensity; $L_a$ and $L_b$ are the light intensities at two adjacent control points on light source layer 32; $x_a$ and $x_b$ are the locations of the control points. The difference $|x_a - x_b|$ is equal to a resolution by which light source layer 32 is controlled. $\xi$ is a parameter having a value in the range of 1.0 to 1.5.

Figure 5A:
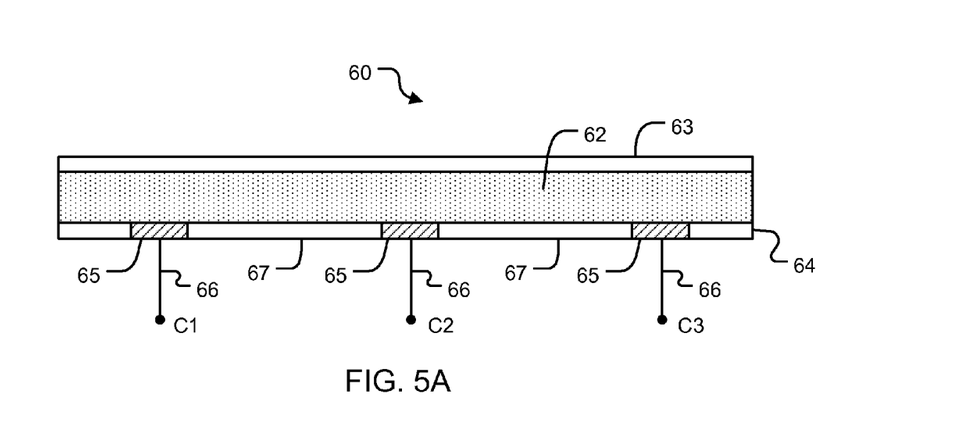
FIG. 5A illustrates a backlight according to an example embodiment of the invention.
Figure 5B:
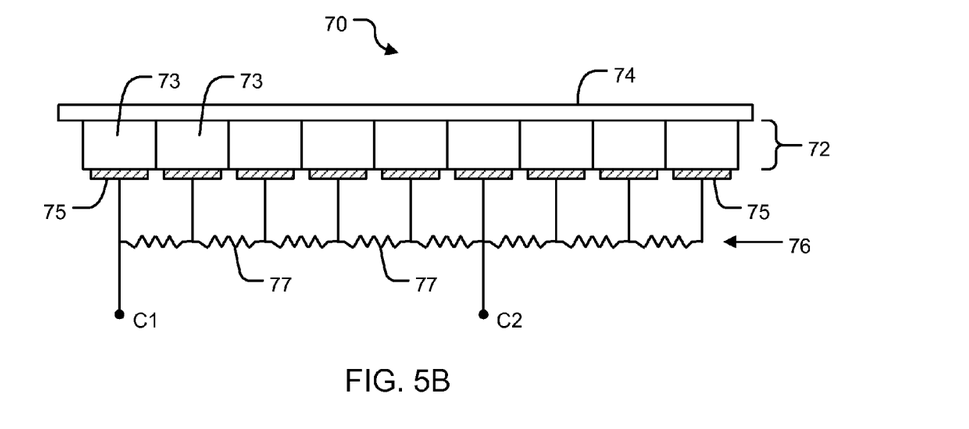
FIG. 5B illustrates a backlight according to an example embodiment of the invention.

FIGS. 5A and 5B show two example constructions for light source layer 32. Light source layer 60 shown in FIG. 5A has a light generating layer 62 located between an optically transparent front electrode 63 and a rear electrode structure 64. Light generating layer 62 emits light having an intensity determined by an electrical field across light generating layer 62. Electrode structure 64 comprises a number of control points 65 connected to driving circuits by suitable conductors 66. The driving circuits (designated by C1, C2, C3 in the illustrated embodiment) can control the electrical potentials applied to different control points 65. In some embodiments the electrical potentials applied by the driving circuits are relatively low, for example, 15 volts or lower. Higher voltages may be applied in other embodiments.

It is not mandatory that control points 65 be point-like. In some embodiments, control points 65 comprise electrically-conductive pads. The pads are relatively large compared to pixels of a spatial light modulator in some embodiments. The pads may be but are not necessarily round. The pads may have rounded corners.

Light source layer 60 may comprise, for example, organic light emitting diode (OLED) layers, substrates coated with or incorporating phosphors, white Field Emissive Display (FED) layers, phosphor-coated plates, electrofluorescent materials, and the like. In general, any electro-luminescent technology may be applied in light source layer 60. These technologies operate on the common principle of converting electrical energy into photon (light) emission. Typically electrical potential across a thin layer or a suitable material results in light emission. The magnitude of the light emission can be approximately proportional to the strength of the electrical field applied across the thin layer material (and the corresponding current flow).

A layer of a potential-distributing material 67 is in contact with and extends between control points 65. The potential-distributing material may comprise a material that is electrically conducting but has electrical resistance such that the electrical potential varies smoothly as one moves between the control points along a path in the potential-distributing material. In some embodiments potential-distributing material 67 may comprise a weak electrical conductor, for example a suitable conducting polymer or other resistive film.

The degree of electrical conductivity of the layer of potential-distributing material 67 may be chosen depending upon the amount of electrical current needed (if any) to actuate light source layer 60. Where light source layer 60 draws only a low or very low current then potential-distributing material 67 may comprise a nearly-insulating dielectric material, for example (although a material having greater electrical conductivity could also be used). Where light source layer 60 is of a type that draws greater amounts of electrical current (for example a strongly emissive layer such as a layer of OLEDs) then potential-distributing material 67 advantageously has a somewhat greater electrical conductivity. In some embodiments the potential-distributing material may have a sheet resistance of $10^{12}$ Ω/square or less. In some embodiments the potential-distributing material has a sheet resistance of $10^7$ Ω/square or less. In some embodiments the potential-distributing material has a sheet resistance in the range of $10^2$ or $10^3$ to $10^7$ Ω/square.

If all of control points 65 are maintained at the same electrical potential by the control circuits then the electric field across all portions of light generating layer 62 is fairly uniform with the result that the light emitted by light source layer 60 is fairly spatially uniform.

On the other hand, if different ones of control points 65 are maintained at different electrical potentials then the electrical potential will vary from place to place on electrode structure 64. This variation of electrical potential will, in general, be smooth because of the presence of potential-distributing material 67. The intensity of light emitted by light emitting layer 60 will therefore vary from location to location in a smooth manner with the overall variation in light intensity determined by the combination of electrical potentials that are applied to control points 65.

Control points 65 may, for example, be arranged in a regular array, such as a grid, a hexagonal or triangular array, a rectangular array or the like. It is not mandatory that the control points have a uniform spatial density or that all neighboring control points be equidistant from one another.

Preferably potential-distributing layer 67 has a reasonably high electrical resistivity so that when different control points 65 are maintained at different electrical potentials, the electrical current flowing between different ones of control points 65 through potential-distributing layer 67 is fairly small and does not dissipate significant amounts of energy so as to cause potential-distributing layer 67 or light generating layer 62 to overheat.

In displays according to some embodiments, there are in the range of 50 to 5000 control points. In some embodiments, a ratio of control points to pixels is in the range of 1:200 to 1:40,000. In some embodiments the display comprises 1 million or more pixels whereas the number of control points is a few thousand or less.

FIG. 5B shows a light source layer 70 according to an alternative embodiment. Light source layer 70 has a light generating layer 72 which is divided into an array of pixels 73. Each pixel 73 generates light having an intensity determined by an electrical field between a transparent front electrode 74 and a control electrode 75. In the illustrated embodiment, transparent front electrode 74 is common to all of the pixels. This is not mandatory. Control electrodes 75 are not each individually controlled in this embodiment. Instead, the potential on each of control electrode 75 is determined by the potential at a corresponding node of a resistor network 76. Driving circuits (designated by C1, C2 in the illustrated embodiment) are connected to some but not all nodes on resistor network 76. The potential at such control nodes is determined by the driving signals applied by the driving circuits. The potential on other nodes is determined by the potential drop over the various resistors 77 in resistor network 76. Resistors 77 do not need to be discrete components. Resistors 77 may be fabricated in or on a substrate by any suitable patterning technique, for example. It can be appreciated that the illumination layers 60 and 70 illustrated in FIGS. 5A and 5B can be controlled to emit light in such a manner that the light intensity varies with position on the light emitting layer with relatively few control inputs.

Figure 5C:
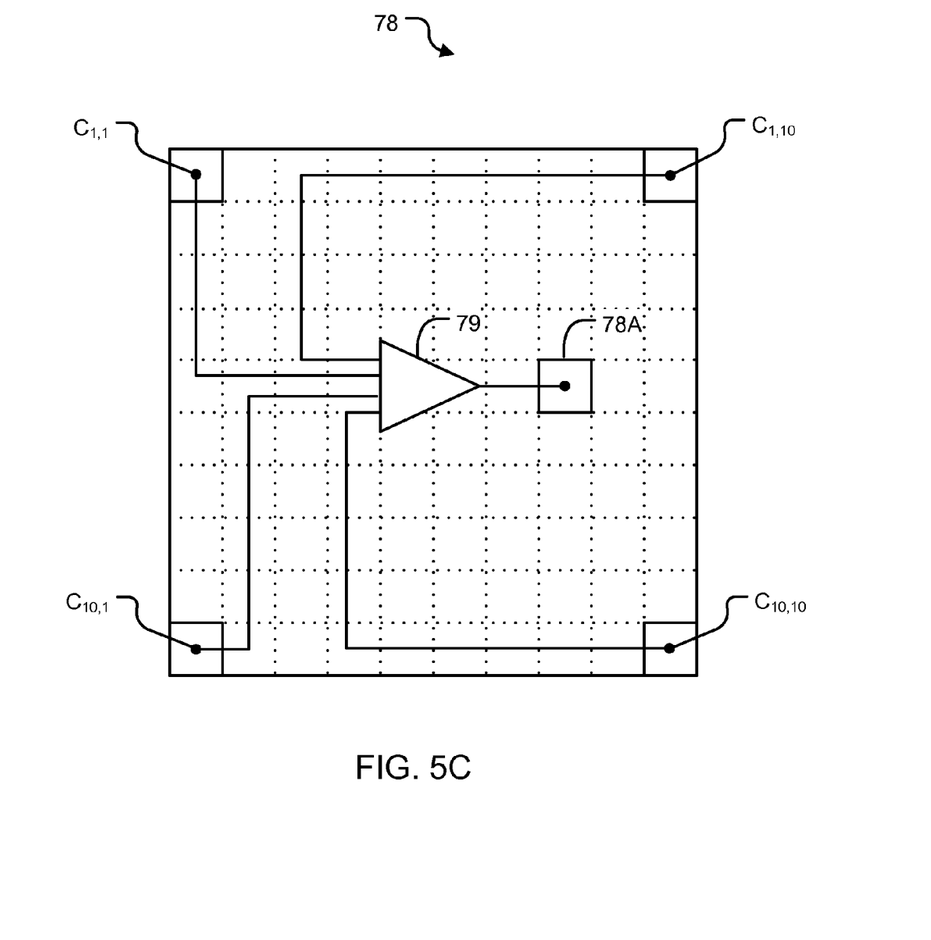
FIG. 5C illustrates schematically a portion of a backlight in which individual areas are driven by circuits that provide interpolation among control values.

In some embodiments, a light emitting layer incorporates active electronics. For example, FIG. 5C shows an embodiment wherein the light source layer 78 comprises an array of small, closely-spaced light sources 78A. Light sources 78A may, for example, comprise light emitting semiconductor junctions such as light emitting diodes or organic light emitting diodes (OLEDs) or the like. Some but not all of light sources 78A are independently controllable. The driving values of the remaining light sources are interpolated from the driving values of the controllable light sources by interpolation circuits 79. For example, the illustrated embodiment shows a 10 by 10 array of light sources having control points ($C_{1,1}$, $C_{10,1}$, $C_{1,10}$, $C_{10,10}$) at its four corners. The driving values at control points $C_{1,1}$, $C_{10,1}$, $C_{1,10}$, $C_{10,10}$ are independently controllable. The driving values of each of the other light sources within the array are determined by an interpolation circuit 79, as is illustrated for a single light source 78A in FIG. 5C. The illustrated interpolation circuit 79 takes as inputs the driving values of control points $C_{1,1}$, $C_{10,1}$, $C_{1,10}$, $C_{10,10}$ and outputs a driving value for corresponding light source 78A. The output of a particular interpolation circuit 79 may be determined by multiplying the driving values at each input control point by a corresponding fixed parameter. The parameters are proportional to the relative distances between the input control points and the given light source. Parameters of interpolation circuits 79 may be set differently for different light sources. When suitable control signals are applied to the control points, the individual light emitting diodes emit light that varies smoothly over the array of light emitters.

Figure 6:
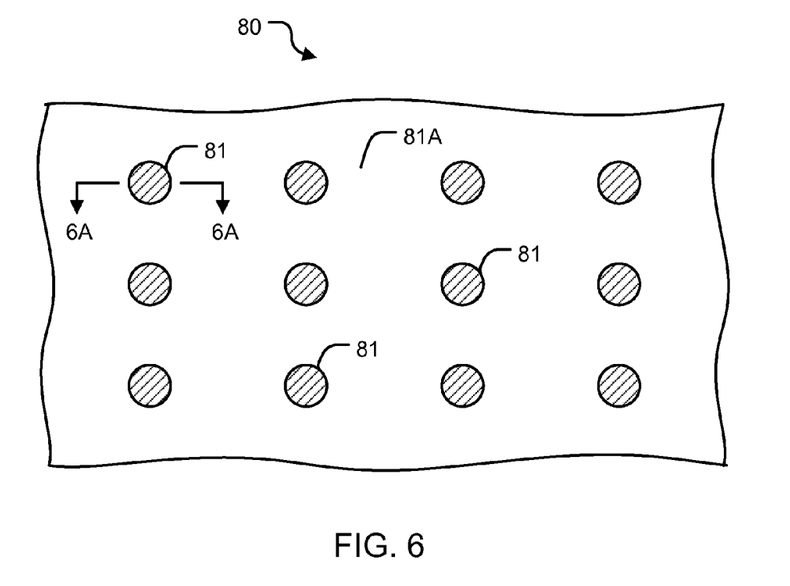
FIG. 6 illustrates a backlight according to another example embodiment of the invention.
Figure 6A:
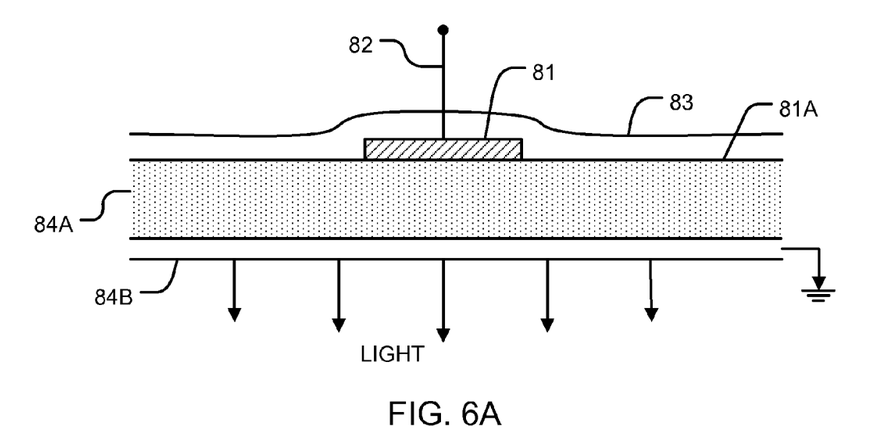
FIG. 6A is a partial cross-section on line 6A-6A of FIG. 6.

FIG. 6 illustrates a light emitting layer 80 according to another embodiment. Light emitting layer 80 has an array of electrically conducting pads 81 on its rear surface 81A. As shown in FIG. 6A, each pad 81 is connected to a control line 82 in any suitable manner. A layer 83 of a weakly electrically conducting material is applied over control points 81. A light generating material 84A is located between rear surface 81A of light emitting layer 80 and an optically transparent front electrode 84B. Light generating material 84A emits light having an intensity determined by an electrical field across light generating material 84A. The intensity of light emitted by light emitting layer 80 will vary from location to location in a smooth manner based on the electrical potentials that are applied to pads 81.

Figure 7:
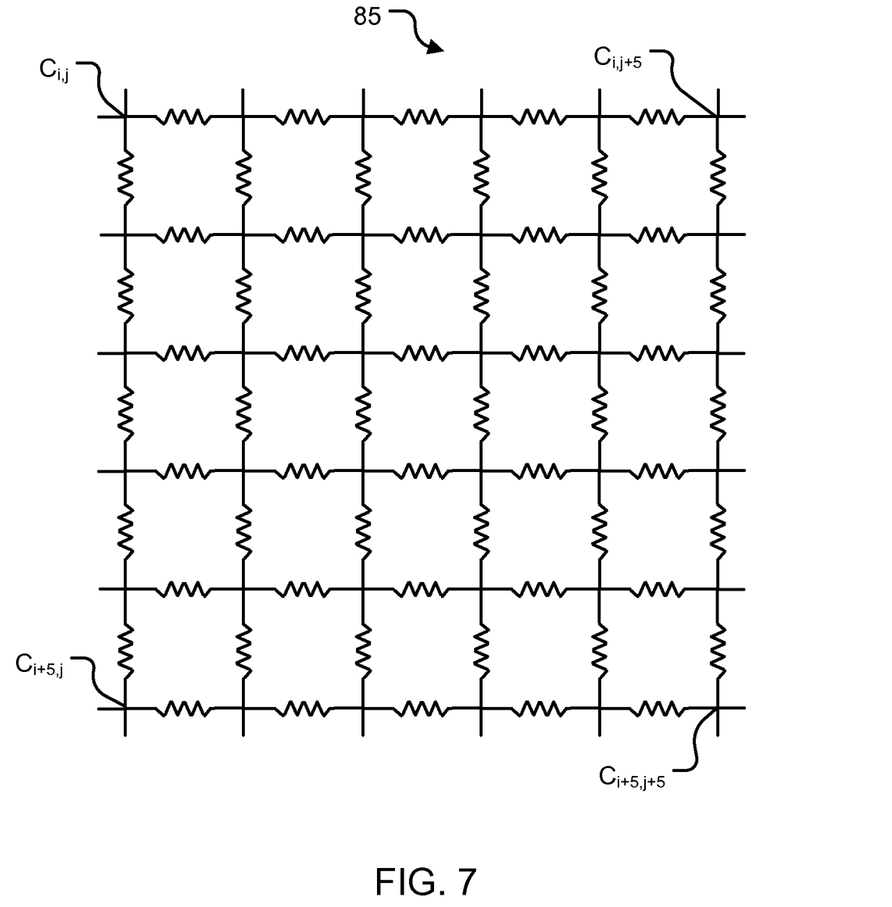
FIG. 7 shows schematically an electrical network in a backlight according to an example embodiment of the invention.

FIG. 7 illustrates a resistor array 85 having control points at its corners. In the illustrated embodiment, the control points divide the resistor array into 5×5 arrays of nodes. The control points are therefore at nodes $C_{ij}, c_{i,j+5}, c_{i+5}; \ldots$ etc. A potential at each node is a function of the potentials applied to the control points. The potentials at the different nodes may be applied to control a light output for a corresponding area of a light emitting layer.

Figure 8A:
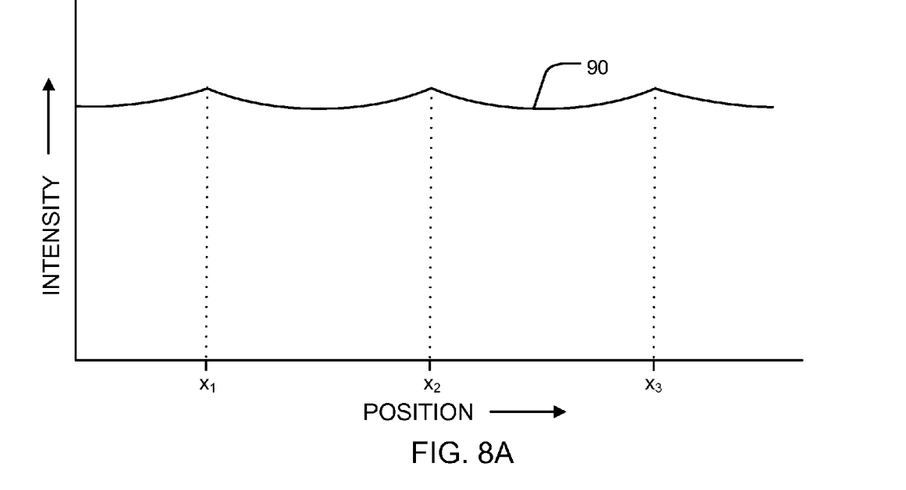
FIGS. 8A and 8B illustrate a variation in electrical field with position along a light emitter for various control inputs.
Figure 8B:
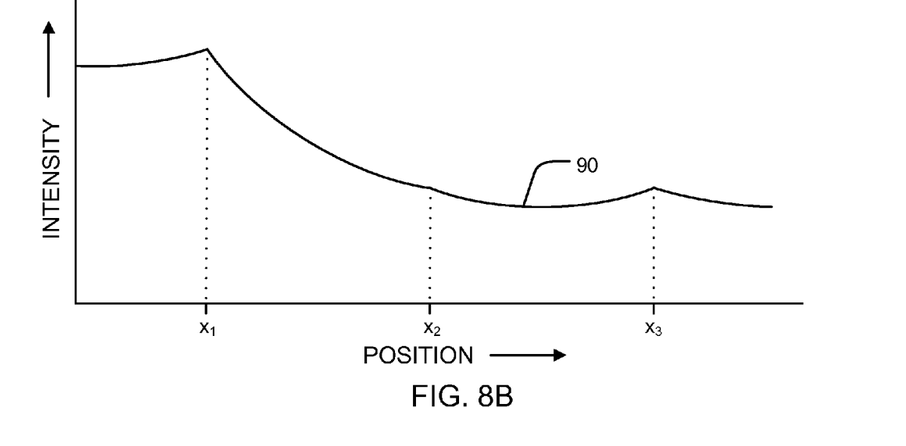

FIGS. 8A and 8B illustrate light emission from a light emitter according to an example embodiment. In each case, the locations of control points are indicated by $x_1$, $x_2$ and $x_3$. FIG. 8A illustrates a situation in which an equal potential is applied to each of the control points. It can be seen that the curve 90 which indicates the light emission across the light emitting layer is relatively constant. FIG. 8B illustrates a situation in which a greater potential is applied to control point $x_1$ than is supplied to control points $x_2$ and $x_3$. It can be seen that the light emission indicated by curve 90 varies smoothly from a higher level at control point $x_1$ to lower values corresponding to the electrical potentials at control points $x_2$ and $x_3$.

Figure 9:
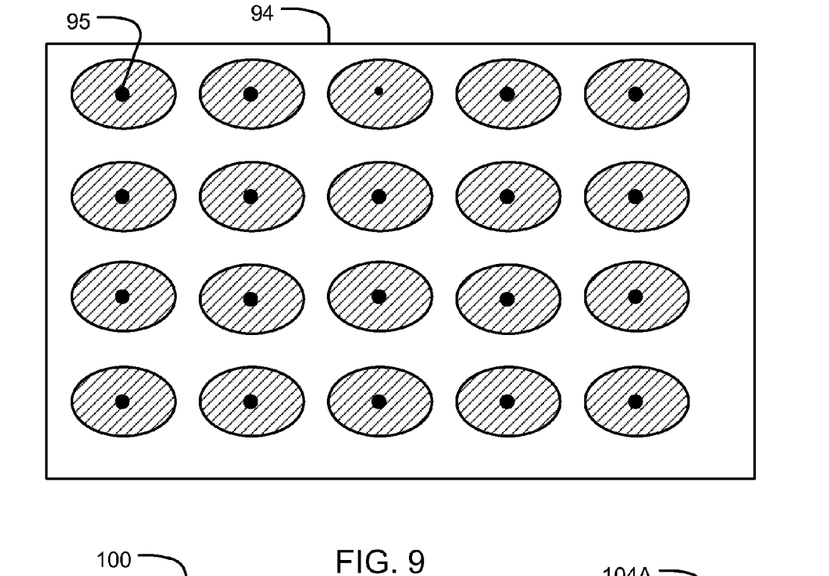
FIG. 9 is a schematic view of a backlight according to an example embodiment having an absorbing layer that is densest at locations corresponding to control points.

In some embodiments, an optically absorbing layer is applied to the front surface of light emitting layer 32 to reduce the intensity of light emitted at brighter regions (e.g. regions corresponding to control points) so as to permit the light output of the light emitting layer to be set to be completely uniform. FIG. 9 shows an example embodiment wherein an absorbing layer 94 has a greater optical density (i.e. absorbs more light) in areas at or near to control points 95. The optical density of the absorbing layer 94 drops off with distance from the control points. The optical density most conveniently drops off smoothly with distance from control points 95. In alternative embodiments, the known light emission from the light emitting layer is compensated for in image processing which appropriately sets pixels of the spatial light modulator based upon the light emitted by the light emitting layer.

In some embodiments, the light emitted by light source layer 62 is monochrome. In other embodiments, the emitted light spans a broader color gamut. For example, the emitted light may comprise broadband light or a mixture of light having different spectra. In some specific example embodiments light source layer 62 emits light that is white or can be filtered to yield white light. White light may, for example, be generated by:

provi ding a mixture of broadband light emitters in light source layer 62. The broadband light emitters may comprise, for example, blue and yellow broadband phosphors. Such phosphors are used in some white LEDs.

providing a mixture of narrow-band light sources in light source layer 62. The narrow-band light sources may comprise, for example, sources of red, green and blue light.

some combination thereof.

etc.

In some embodiments light from two or more light source layers 62 is combined to provide illumination of a spatial light modulator 14. In some embodiments, the different light source layers 62 are constructed to provide light having spectral characteristics. For example, a color display may comprise separate red-, green- and blue-emitting light source layers 62.

Figure 10:
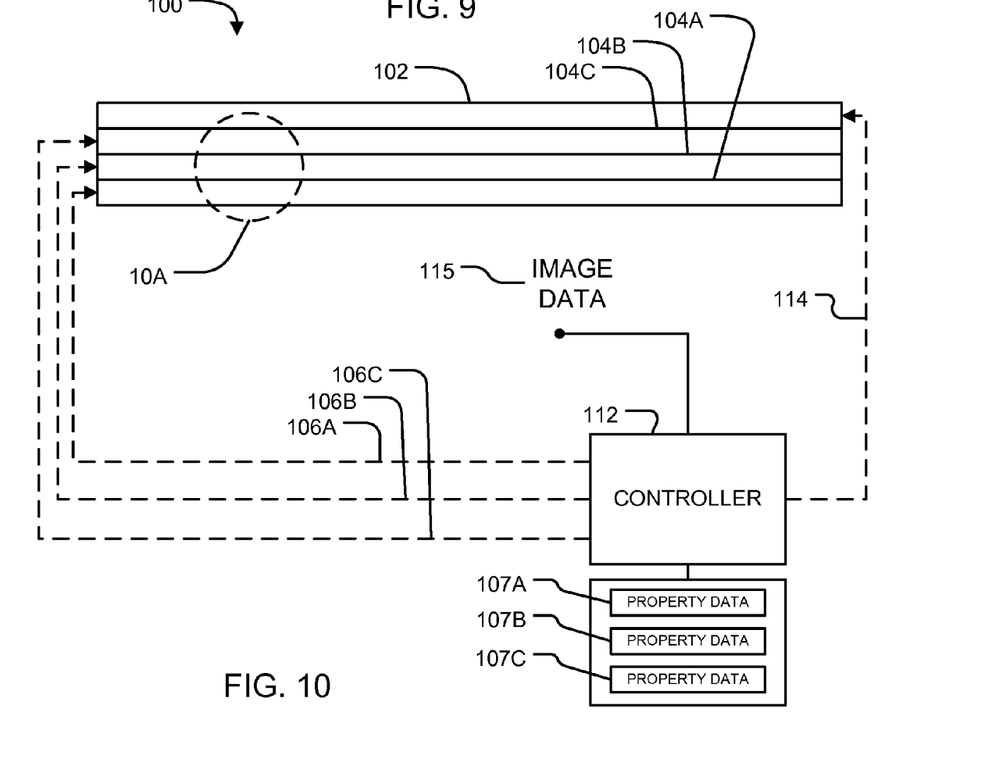
FIG. 10 is a Schematic view of a color display according to an example embodiment.
Figure 10A:
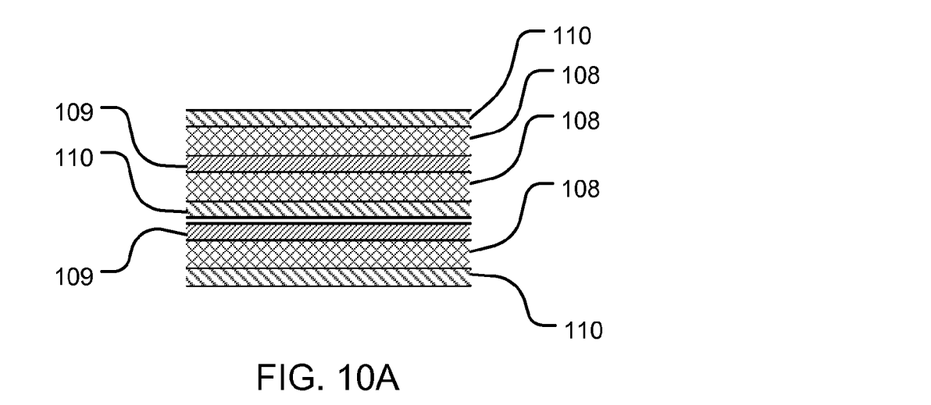
FIG. 10A is an enlarged schematic view of the portion 10A of the light source of the display of FIG. 10.

FIG. 10 shows a display 100 according to an example embodiment. Display 100 has a color spatial light modulator 102 illuminated by a backlight comprising first, second and third light emitters 104A, 104B and 104C (collectively light emitters 104). Light-emitters 104B and 104C are essentially transparent to light emitted by light emitter 104A. Light emitter 104C is essentially transparent to light emitted by light emitters 104A and 104B. As shown in FIG. 10A, each light emitter 104 may comprise a light-emitting layer 108 sandwiched between a common electrode 109 and a control layer 110. Control layer 110 is constructed according to an embodiment such as those described herein which permits the amount of light emitted to be controllably varied smoothly from location to location in response to a relatively small number of control inputs. The electrodes and control layers may comprise optically transparent materials that are electrically conducting, such as indium tin oxide. The thickness and doping of the control layer may be adjusted to provide desirable resistivity characteristics.

In the embodiment illustrated in FIG. 10A, the upper two light-emitting layers 108 (as seen in the Figure) share one common electrode 109. This is not mandatory. Each light-emitting layer 108 could have a separate common electrode 109.

In display 100, each light emitter 104 may be separately controlled. In the illustrated embodiment, a three-channel controller 112 receives image data 115 defining color images. Controller 112 generates sets of control signals 106A, 106B and 106C which control driving circuits for light emitters 104A, 104B and 104C respectively. Controller 112 estimates the resulting amount of light of each color at pixels of spatial light modulator 102. This estimation is based on properties 107A, 107B and 107C of the light emitters 104A, 104B and 104C respectively. Controller 112 generates control signals 114 for the pixels of spatial light modulator 102. The control signals are generated from the estimated amounts of light and the image data. In an alternative embodiment, the display of different colors is time multiplexed. In such embodiments, spatial light modulator 102 may be a monochrome spatial light modulator.

Figure 11:
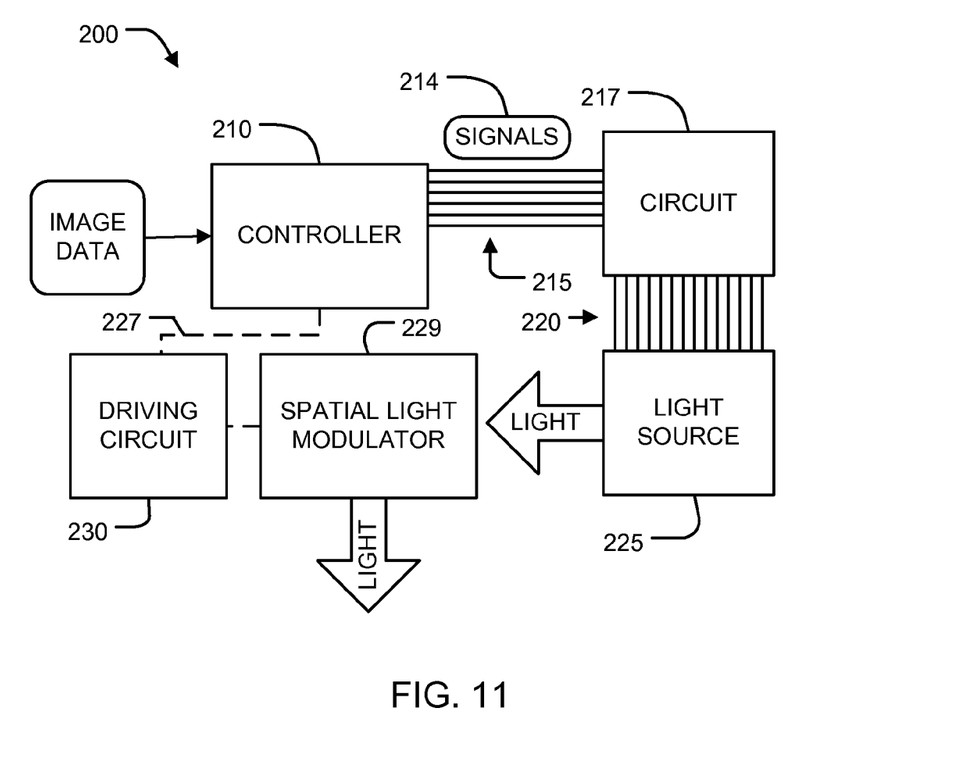
FIG. 11 is a schematic depiction of a display according to another embodiment.

FIG. 11 shows a display 200 according to another example embodiment. Display 200 has a controller 210 which receives or accesses image data 212. Controller 210 is configured to generate from image data 212 a plurality of first output signals 214 that are impressed on a corresponding plurality of output lines 215. Output lines 215 are supplied as inputs to a circuit 217 that has a plurality of output lines 220 that can carry driving signals 222. Output lines 220 are connected to control the intensity of illumination provided by areas of a light source 225. Circuit 217 operates to cause light source 225 to emit light such that the intensity of the emitted light varies smoothly over an emitting surface of light source 225. The combination of controller 210 and circuit 217 results in areas of light source 225 corresponding to brighter areas of an image specified by image data 212 emitting light that is more intense while areas of light source 225 corresponding to dimmer areas of the image emit light that is less intense.

Controller 220 also generates control signals 227 for a spatial light modulator 229. Control signals 227 control pixels of spatial light modulator 229 by way of a suitable driving circuit 230. Controller 230 may, for example, have a construction like that of controller 34 which is described above.

In embodiments having a potential-distributing layer, it is not mandatory that the potential-distributing layer be uniform in resistivity. In some embodiments the potential-distributing layer is variably doped, has a variable thickness or is otherwise spatially varied to produce desirable electrical field characteristics.

An alternative way to smoothly control light output based on a relatively small number of control inputs is to provide a light absorber, such as a LCD, controlled as described above. In such embodiments, the light transmission at different spatial locations of the LCD is a function of the electrical potential at those locations.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A light source comprising:
    a light-emitting layer operative to emit light in response to an electrical potential difference being applied across the light-emitting layer, emitted light having an intensity dependent upon a magnitude of the potential difference;
    a first electrode structure comprising a first electrically-conductive electrode on a first face of the light-emitting layer;
    a second electrode structure comprising a layer of a potential-distributing material having an electrical resistance on a second face of the light-emitting layer and an array of control points in electrical contact with the layer of potential-distributing material at locations spaced apart over the second face of the light-emitting layer; and
    a power supply having a plurality of independently-controllable outputs, the outputs each connected to a corresponding one of the control points; and
    wherein the control points have a non-uniform spatial density and the control points are concentrated more densely in a central region of the light-emitting layer and less densely in a peripheral region of the light-emitting layer.

2. A light source according to claim 1 wherein the light-emitting layer comprises an organic light emitting diode (OLED) layer.

3. A light source according to claim 1 wherein the light-emitting layer comprises one of a phosphor-coated plate and an electrofluorescent material.

4. A light source according to claim 1 wherein the control points are arranged in a rectangular grid.

5. A light source according to claim 1 wherein the first electrode is substantially transparent to the emitted light.

6. A light source according to claim 1 wherein the potential-distributing layer comprises a doped semiconductor.

7. A light source comprising:
    a light-emitting layer operative to emit light in response to an electrical potential difference being applied across the light-emitting layer, emitted light having an intensity dependent upon a magnitude of the potential difference;
    a first electrode structure comprising a first electrically-conductive electrode on a first face of the light-emitting layer;
    a second electrode structure comprising a layer of a potential-distributing material having an electrical resistance on a second face of the light-emitting layer and an array of control points in electrical contact with the layer of potential-distributing material at locations spaced apart over the second face of the light-emitting layer;
    a power supply having a plurality of independently-controllable outputs, the outputs each connected to a corresponding one of the control points; and
    optically absorbing spots on the first surface of the light emitting layer at locations corresponding to the control points.

8. A light source according to claim 7 wherein the optically absorbing spots have optical densities that drop off with distance from the control points.

9. A display comprising:
    a light source comprising a plurality of control inputs; and
    a spatial light modulator illuminated by the light source;
    wherein:
        the control inputs correspond to spots on the light source,
        the spatial light modulator comprises a plurality of pixels, each illuminated by a different area of the light source,
        the illumination provided by each of the different areas of the light source is a function of the position of the area relative to positions of the spots and of signals applied to the control inputs; and
        the control points have a varying spatial density and the control points are concentrated more densely in a central region of the light-emitting layer and less densely in a peripheral region of the light-emitting layer.

10. A display according to claim 9 wherein the spots are arranged in a rectangular array.

11. A display according to claim 9 wherein the light source is coextensive with the spatial light modulator.

12. A display according to claim 9 comprising a controller operative to apply a first set of signals to the control inputs of the light source and a second set of signals to control pixels of the spatial light modulator.

13. A display according to claim 12 wherein the controller is configured to generate each of the first and second sets of signals based upon image data.

14. A display according to claim 13 wherein the controller is configured to generate the first set of signals by an algorithm comprising at least one of low-pass filtering and down-sampling the image data.

15. A display according to claim 13 wherein the controller comprises:
    an image processor connected to receive the image data and generate the first set of signals based on the image data;
    a light field estimator connected to receive the first set of signals and to generate an estimate of the light field that would be produced by the light source layer in response to the first set of signals; and
    a computation unit connected to receive the image data and the estimated light field and to generate the second set of signals based on the image data and the estimated light field.

16. A display according to claim 15 wherein the estimate of the light field comprises a two-dimensional map indicating light intensity as a function of position on the light source.

17. A display according to claim 15 wherein the computation unit performs a calculation which comprises dividing an intensity value represented by the image data for a particular pixel by a value of the estimated light field corresponding to the area of the light source corresponding to the pixel.

18. A display according to claim 15 wherein the light field estimator is operative to:
based on the first set of signals, determine an electrical potential as a function of position on the light source;
and, based on a function relating light output to applied electrical potential, estimate light outputs for positions on the light source.

19. A display according to claim 15 wherein the illumination provided by the light source varies smoothly in a manner given by the equation:

$$\left|\frac{dl}{dx}\right| \leq \left|\frac{L_a - L_b}{x_a - x_b}\right| \times \xi$$

where l is the light intensity; x is a measure of position, $L_a$ and $L_b$ are the light intensities at two adjacent control points on the light source; $x_a$ and $x_b$ are the locations of the control points and $\xi$ is a parameter having a value in the range of 1 to 1½.

20. A display according to claim 9 wherein a ratio of control spots of the light source to pixels of the spatial light modulator is in the range of 1:200 to 1:40,000.

* * * * *